(12) United States Patent
Yen

(10) Patent No.: US 7,495,577 B2
(45) Date of Patent: Feb. 24, 2009

(54) MULTIPURPOSE RADIO

(76) Inventor: Jen-Yen Yen, No. 22-1, Lane 3, Haochin Rd., Nanhsin Tsun, Yenpu Hsiang, Changhua County (TW)

(*) Notice: Subject to any disclaimer, the term of this patent is extended or adjusted under 35 U.S.C. 154(b) by 322 days.

(21) Appl. No.: 11/591,642

(22) Filed: Nov. 2, 2006

(65) Prior Publication Data

US 2008/0106149 A1   May 8, 2008

(51) Int. Cl.
*G08B 5/22* (2006.01)
*H04B 1/38* (2006.01)
*H02J 7/00* (2006.01)

(52) U.S. Cl. ............... 340/815.45; 340/321; 340/601; 340/333; 340/539.1; 340/693.2; 455/404.1; 455/573; 455/90.1; 455/127.1; 320/114; 322/1; 362/193

(58) Field of Classification Search ............. 340/815.45
See application file for complete search history.

(56) References Cited

U.S. PATENT DOCUMENTS 7,019,492 B1 * 3/2006 Baker et al. ................. 320/114
7,239,237 B2 * 7/2007 Hess ....................... 340/539.1

* cited by examiner

*Primary Examiner*—Donnie L Crosland
(74) *Attorney, Agent, or Firm*—Rosenberg, Klein & Lee

(57) ABSTRACT

A multipurpose radio is disclosed to include a power control unit, which uses a rechargeable battery to provide the necessary working voltage to a LED lamp for illumination, a hand-driven dynamo to generate electricity for recharging the rechargeable battery, a power adapter for charging the rechargeable battery with city power supply, a radio circuit unit for receiving AM and FM radio broadcasting signals, TV audio signals and NOAA signals, and a function mode display unit, which uses a speaker for voice output, a screen for data display, and a selector key for frequency selection.

1 Claim, 3 Drawing Sheets

MULTIPURPOSE RADIO

BACKGROUND OF THE INVENTION

1. Field of the Invention

The present invention relates to a radio and more particularly, to such a multipurpose radio having a hand-driven power generator means.

2. Description of the Related Art

Conventional mobile radios commonly use a battery to provide the necessary working voltage. When the power of the battery of a radio is low, the battery must be immediately replaced. In case no new battery is available, the radio becomes not operable. Therefore, a person must carry a certain number of battery cells when using a radio in a high mountain. Further, conventional radios are simply used for broadcasting, not usable for illumination or other purposes

SUMMARY OF THE INVENTION

The present invention has been accomplished under the circumstances in view. According to one aspect of the present invention, the multipurpose radio is equipped with a LED lamp and a rechargeable battery for illumination. According to another aspect of the present invention, the multipurpose radio comprises a power control unit, which uses a hand-driven dynamo to provide power for charging the rechargeable battery when battery power is low and when city power supply is not available. According to still another aspect of the present invention, the multipurpose radio comprises a power adapter for charging the rechargeable battery with city power supply. According to still another aspect of the present invention, the multipurpose radio comprises a radio circuit unit for receiving AM and FM radio broadcasting signals, TV audio signals and NOAA signals, and a function mode display unit, which uses a speaker for voice output, a screen for data display, and a selector key for frequency selection.

DETAILED DESCRIPTION OF THE PREFERRED EMBODIMENT

Figure 1:
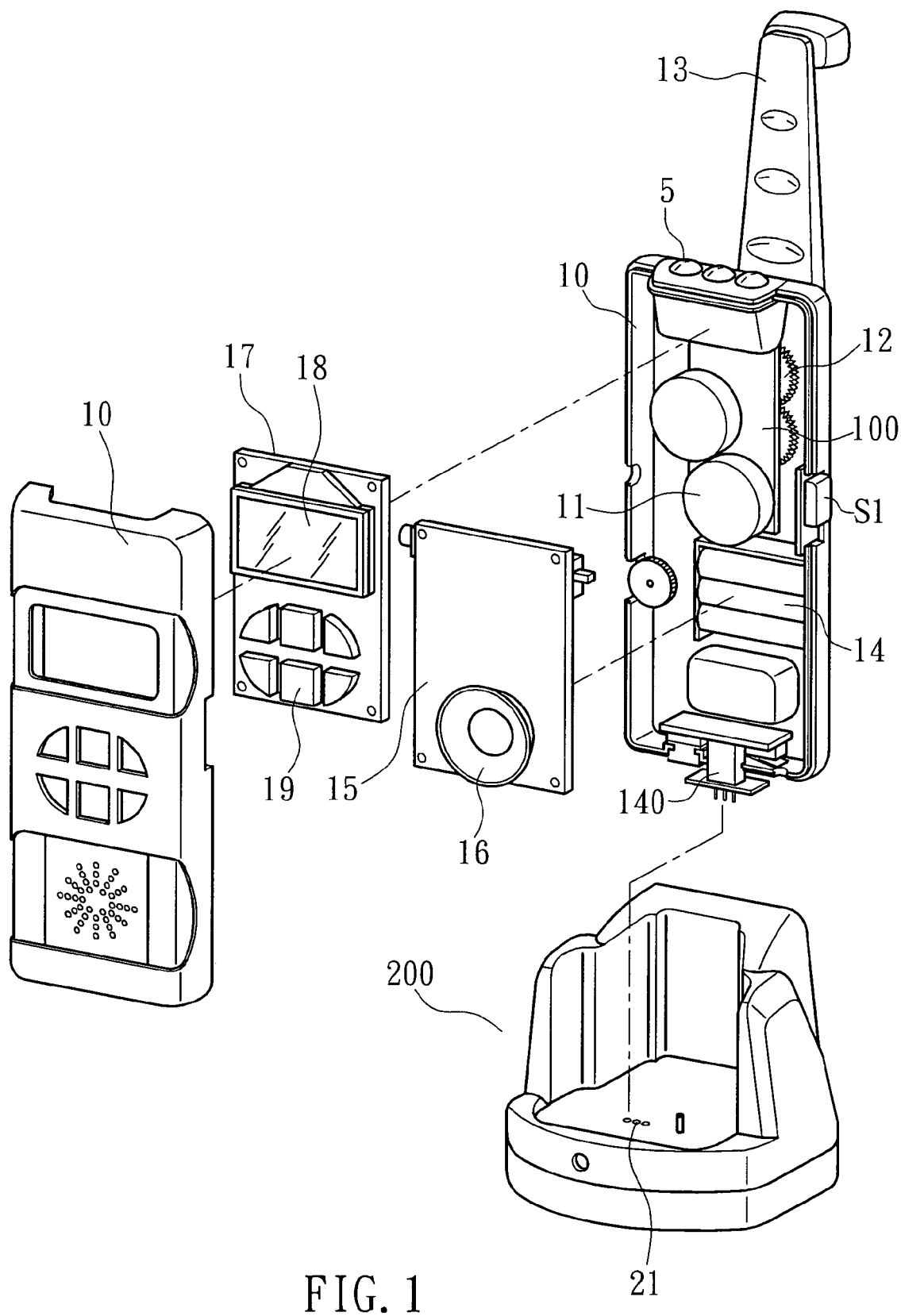
FIG. 1 is an exploded view of a radio according to the present invention.
Figure 2:
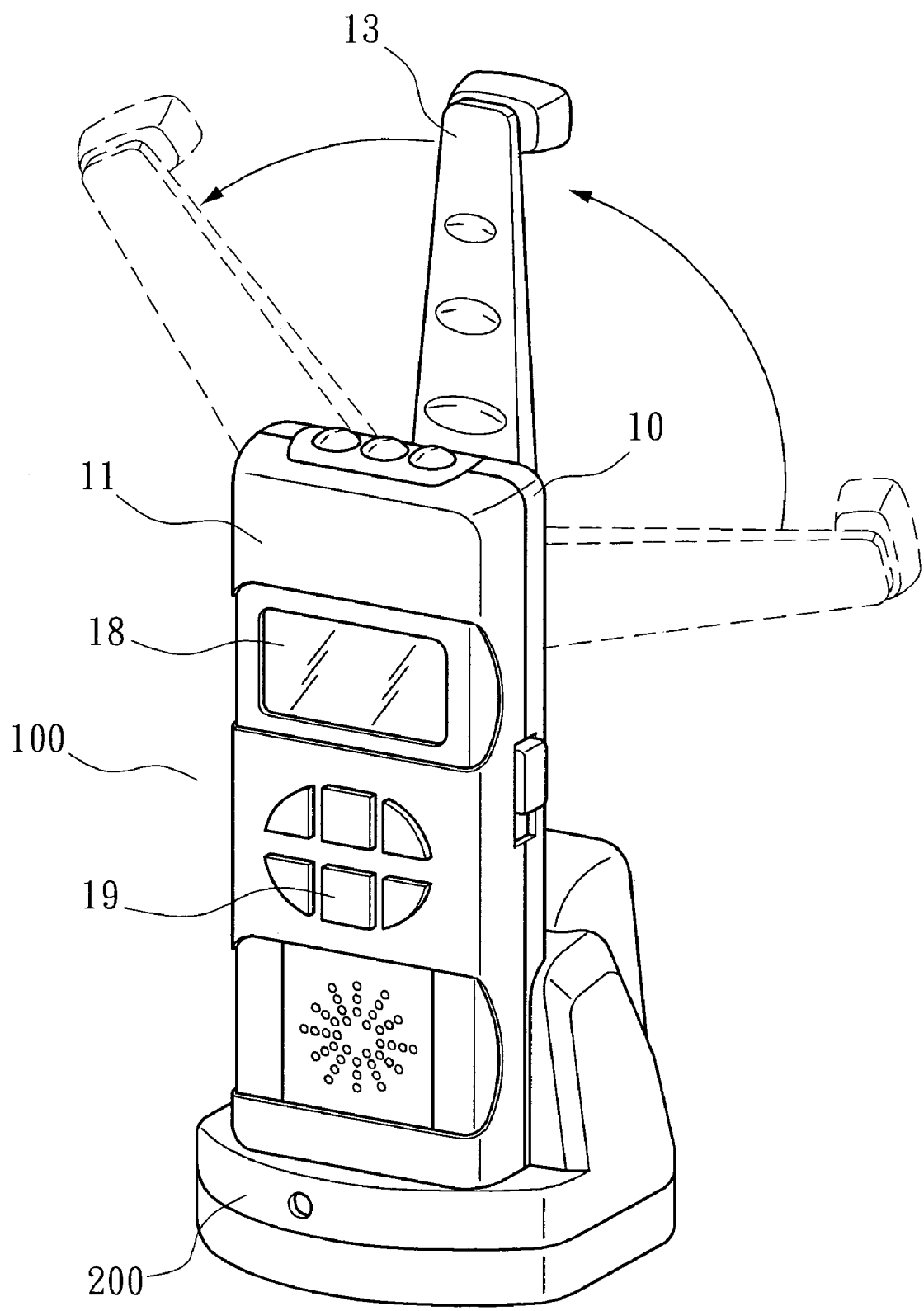
FIG. 2 illustrates the outer appearance of the radio according to the present invention.
Figure 3:
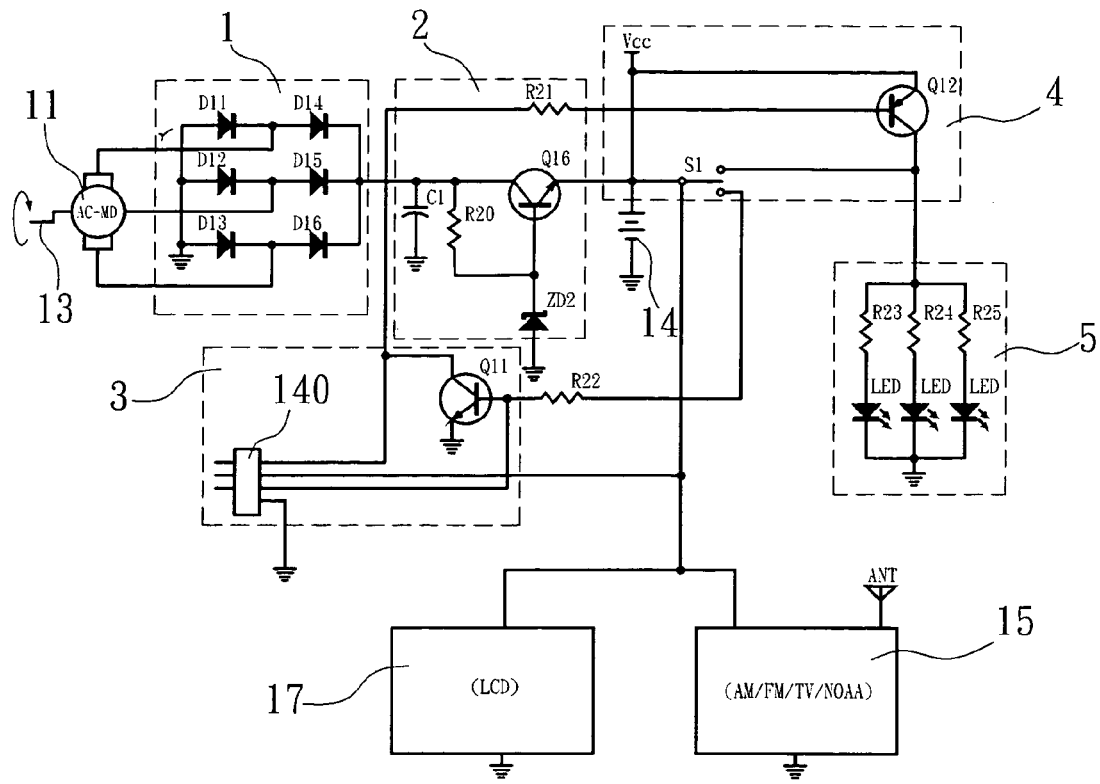
FIG. 3 is a circuit diagram of the radio according to the present invention.
Figure 4:
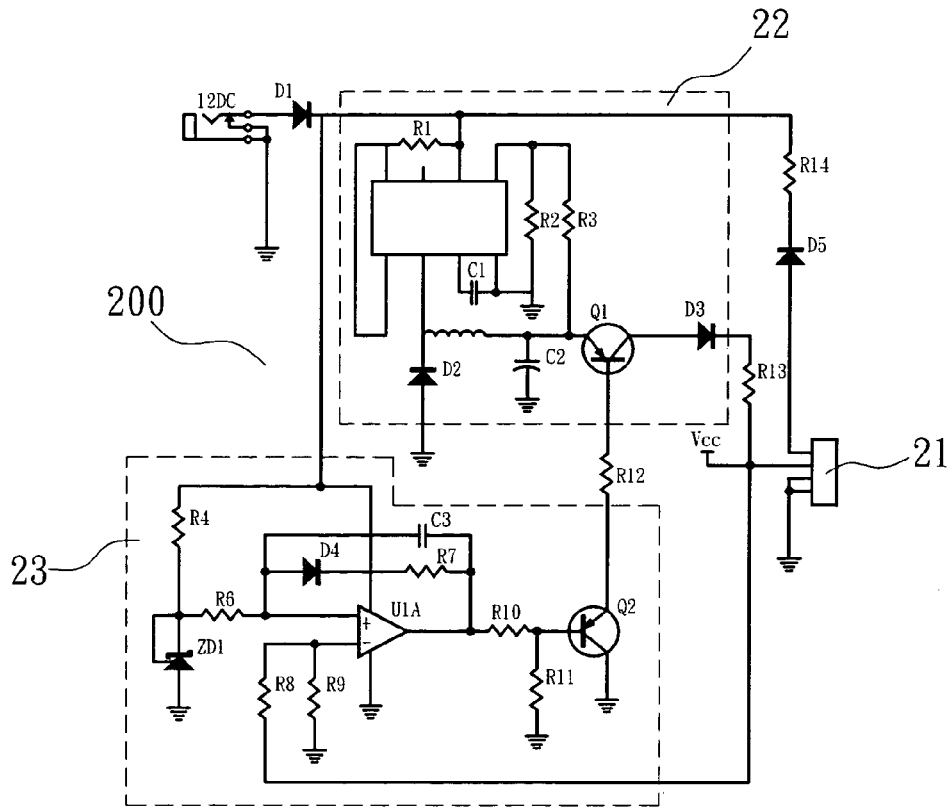
FIG. 4 is a circuit diagram of a power adapter according to the present invention.

Referring to FIGS. 1~4, a radio in accordance with the present invention is shown comprising a housing 10. The housing 10 houses a power control unit 100, a radio circuit unit 15, and a function mode display unit 17.

The power control unit 100 comprises a dynamo 11, a rectifier 1, a hand-driven charging circuit 2, a city power supply charging circuit 3, a power failure auto-lighting circuit 4, and a LED lamp 5. A crank handle 13 is coupled to the dynamo 11 through a transmission gear set 12. The rectifier 1 is comprised of diodes D11~D16 and adapted to rectify AC into DC. The hand-driven charging circuit 2 is comprised of a transistor Q16 and a zener diode ZD2. The hand-driven charging circuit 2 is off when the dynamo 11 is off. When the dynamo 11 is working, the hand-driven charging circuit 2 is driven to charge the battery 14 with the output DC power supply o the dynamo 11. The city power supply charging circuit 3 is comprised of a transistor Q11 and an electric plug 140, and electrically connectable to the socket 21 of a power adapter 200, which is connectable to city power supply for enabling the city power supply charging circuit 3 to charge the battery 14 with city power supply. The power failure auto-lighting circuit 4 is comprised of a transistor Q12, which is turned on when city power supply is off, or turns off when city power supply is on. The LED lamp 5 is comprised of multiple LEDs (Light Emitting Diodes). Further, the LED lamp 5 and the power failure auto-lighting circuit 4 are electrically connected in series to a selector switch S1, which can be switched between a first mode where the LED lamp 5 is automatically turned on when city power supply failed, and a second mode where the LED lamp 5 is turned on constantly so that the multipurpose radio is used as a hand light. The radio circuit unit 15 is adapted to receive AM and FM radio broadcasting signals, TV audio signals, NOAA signals, etc. The function mode display unit 17 has a speaker 16 for voice output, a screen 18 for data display, and a selector key 19 for frequency selection. The aforesaid power adapter 200 comprises an overcurrent protection circuit 22 and an overvoltage protection circuit 23. The overcurrent protection circuit 22 and an overvoltage protection circuit 23 are respectively comprised of a transistor Q1 or Q2 that is on when the electric current or voltage passing through is normal, or off when the electric current or voltage passing through is abnormal, thereby protecting the power control unit 100 against abnormal electric current and voltage during charging The multipurpose radio of the invention provides following functions:

1. Hand-driven Power Supply:

When the user operates the crank handle 13 to rotate the transmission gear set 12, the dynamo 11 is driven to generate electricity that is then rectified by the rectify 1 into DC to turn on the transistor Q16 and zener diode ZD2 of the hand-driven charging circuit 2 for charging the battery 14. Therefore, the multipurpose radio is still operable when no battery is available for a replacement.

2. City Power Supply Charging:

The user can use the power adapter 200 to connect the city power supply charging circuit 3 to city power supply outlet for charging the battery 14 with city power supply.

3. Broadcasting Signal Receiving:

By means of the radio circuit unit 15 and the function mode display unit 17, the multipurpose radio is used to receive AM and FM radio broadcasting signals, TV audio signals, NOAA signals, etc. Therefore, the multipurpose radio can be used as a rescue means in a mountain or catastrophe place.

4. Power Failure Auto-lighting:

When city power supply failed after connection of the power failure auto-lighting circuit 4 to city power supply through the power adapter 200 and switching of the selector switch S1 to the first mode, the transistor Q12 of the power failure auto-lighting circuit 4 is turned on to drive the LED lamp 5 to emit light for illumination.

5. Hand Light Function:

When the selector switch S1 is switched to the second mode, battery power supply is connected from the battery 14 to the LED lamp 5, thereby driving the LED lamp 5 to emit light for illumination.

A prototype of multipurpose radio has been constructed with the features of FIGS. 1~4. The multipurpose radio functions smoothly to provide all the features discussed earlier.

Although a particular embodiment of the invention has been described in detail for purposes of illustration, various modifications and enhancements may be made without What the invention claimed is:

1. A multipurpose radio comprising:

a power control unit, said power control unit comprising a dynamo, a crank handle, a transmission gear set coupled between said crank handle and said dynamo for driving said dynamo to generate electricity, a rechargeable battery, a rectifier comprised of a plurality of diodes electrically connected between said dynamo and said rechargeable battery and adapted to rectify AC into DC, a hand-driven charging circuit comprised of a transistor and a zener diode and electrically connected between said rectifier and said rechargeable battery for charging said rechargeable battery during operation of said dynamo, a power adapter for converting city power supply into DC power supply, a city power supply charging circuit comprised of a transistor and an electric plug and adapted to charge said rechargeable battery with city power supply, a LED lamp comprised of a plurality of light emitting diodes and, a power failure auto-lighting circuit comprised of a transistor adapted to turn on said LED lamp when city power supply fails after connection of said power adapter to city power supply, a selector switch electrically connected to said LED lamp and said power failure auto-lighting circuit and switching between a first mode where said LED lamp is automatically turned on when city power supply failed and a second mode where said LED lamp is turned on constantly so that the multipurpose radio is used as a hand light;

a radio circuit unit adapted to receive AM and FM radio broadcasting signals, TV audio signals, and NOAA signals; and a function mode display unit, said function mode display unit comprising a speaker for voice output, a screen for data display, and a selector key for frequency selection.

* * * * *